(No Model.)
E. J. FULLER.
VINE FASTENER.
No. 525,010.            Patented Aug. 28, 1894.
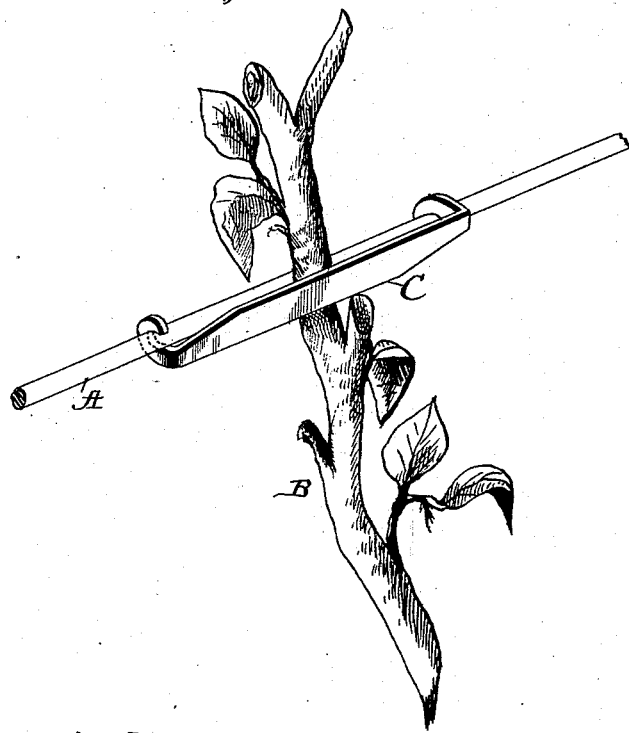
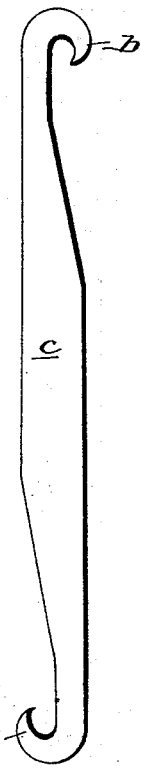
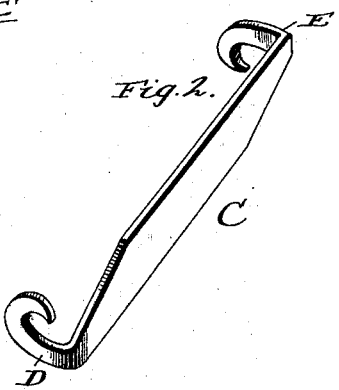
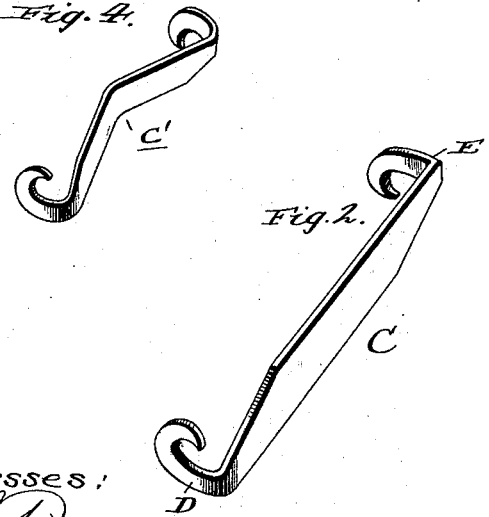
Witnesses:
C. H. Raeder
H. F. Matthews.
Inventor
Eugene J. Fuller
By James J. Sheehy
Attorney

UNITED STATES PATENT OFFICE.

EUGENE J. FULLER, OF SHERIDAN, NEW YORK.

VINE-FASTENER.

SPECIFICATION forming part of Letters Patent No. 525,010, dated August 28, 1894.

Application filed November 2, 1893. Serial No. 489,816. (No model.)

*To all whom it may concern:*

Be it known that I, EUGENE J. FULLER, a citizen of the United States, residing at Sheridan, in the county of Chautauqua and State of New York, have invented certain new and useful Improvements in Vine-Fasteners; and I do declare the following to be a full, clear, and exact description of the invention, such as will enable others skilled in the art to which it appertains to make and use the same.

This invention has relation to improvements in devices for fastening vines to trellis wires or frames, and the novelty will be fully understood from the following description and claim when taken in connection with the annexed drawings, in which—

Figure 1, is a perspective view of my improved device showing the same in connection with a trellis wire, and a vine in position thereon. Fig. 2, is a perspective view of the device removed from the wire and vine. Fig. 3, is a plan view of the blank from which the device is formed, and Fig. 4, is a perspective view in a slightly modified form.

In carrying out my invention, I take a piece of sheet metal of a sufficient length and width, and for the sake of cheapness and rapidity of manufacture, I stamp it with a die or other implement in the form shown in Fig. 3, of the drawings. The material used may be brass, steel, or other suitable flat material, and after cutting or forming the blank as shown in Fig. 3, with the hooks at opposite ends and turned in opposite directions, as shown at $a$, and $b$, I bend such hooked portions at right angles to the main body $c$, which latter is of a considerably greater width than the rest of the blank, so as to present a broad surface bearing to the vine, and thus prevent cutting or injury thereto. With the hooked branches D, and E, bent or turned as described, it will be seen that the hooks will assume a position the reverse to each other, and in opposite directions from the body portion $c$, which is quite long so that it may yield or give during operation.

In the drawings A, indicates the wire of a trellis frame, and B, a vine, while C, indicates my improved fastening device.

In applying the device, I first pass the hook on one end under the trellis wire and carry the plain and broad body portion across the vine, when by pressing the other hook over the wire on the opposite side of the vine, such vine will be yieldingly but firmly clamped against the wire. It is obvious that a device of this character may be very cheaply manufactured, and that small scraps of sheet metal may be utilized and it will also be obvious that vines may be effectively sustained in any position desired without cutting or injuring them.

In Fig. 4, of the drawings, I have shown a fastener of the same general construction as in the other figures, but instead of having the flat body portion $c$, straight, I form a bend about midway of its length as shown at $c'$. This bend is designed, when the fastener is placed upon the trellis wire, to bear against said wire so that spaces will be afforded between the bend and the opposite ends of the fastener to receive the vines. I find that with a fastener of this construction, vines may be held very effectively in position and with less liability to injure them, than where the flat and straight body portion is used, and I therefore prefer to construct the devices as shown in Fig. 4.

I am well aware that a vine fastener formed from a single piece of wire having oppositely disposed hooks at its ends and also having a coil at an intermediate point of its length and adapted to engage a trellis wire, is old: and I therefore make no claim to such a fastener, but—

What I claim, and desire to secure by Letters Patent, is—

The improved device for fastening vines to trellis frames, described, formed from a single piece of sheet metal, cut or shaped as shown, with the broad central or body portion, and the hooked ends, both of which are turned relatively at right angles to the body portion on one side, and the hooks directed oppositely to serve in connection with a vine and trellis wire, substantially as specified.

In testimony whereof I affix my signature in presence of two witnesses.

EUGENE J. FULLER.

Witnesses:
GEO. W. WARREN,
WALTER A. SCOTT.